United States Patent [19]

Kleider

[11] 4,068,124
[45] Jan. 10, 1978

[54] WIRE OBSTACLE WARNING SYSTEM

[75] Inventor: Alfred Kleider, Ocean, N.J.

[73] Assignee: The United States of America as represented by the Secretary of the Army, Washington, D.C.

[21] Appl. No.: 763,439

[22] Filed: Jan. 28, 1977

[51] Int. Cl.² ............................................. G01T 1/24
[52] U.S. Cl. ................................. 250/332; 250/341
[58] Field of Search ..................... 250/332, 341, 330; 343/6 ND

[56] References Cited

U.S. PATENT DOCUMENTS

| | | | |
|---|---|---|---|
| 3,808,435 | 4/1974 | Bate et al. | 250/332 |
| 3,883,437 | 5/1975 | Nummedal et al. | 250/332 |
| 3,887,810 | 6/1975 | Skaggs | 250/332 X |
| 4,040,744 | 8/1977 | Schertz et al. | 250/332 X |

Primary Examiner—Archie R. Borchelt
Attorney, Agent, or Firm—Nathan Edelberg; Bernard Franz; Jeremiah G. Murray

[57] ABSTRACT

A system including a linear CCD sensor array included in a gated optical radar which is particularly adapted to permit pattern recognition of wire or wire-like obstacles during low level flight of the radar platform, e.g. helicopters or the like. The system provides a display and/or automatic warning to the pilot of the location of impending danger so that evasive action may be taken with as little human operator function as possible being required to perform the detection and recognition phase.

13 Claims, 8 Drawing Figures

WIRE OBSTACLE WARNING SYSTEM

The invention described herein may be manufactured and used by or for the Government for governmental purposes without the payment of any royalties thereon or therefor.

BACKGROUND OF THE INVENTION

1. Field of the Invention

This invention relates generally to optical image processing systems and more particularly to a system which will permit the detection, recognition and location of wire type obstacles or targets.

2. Description of the Prior Art

Over a relatively short period of time the helicopter has become an integral part of military hardware. The unique capabilities and characteristics of this type of aircraft has provided solutions to tactical and logistic situations heretofore not easily overcome; however, new problems are simultaneously introduced. Helicopters inherently operate at speeds which make them vulnerable to ground based fire. This low speed operation in conjunction with their characteristic sound levels and patterns makes location and destruction a relatively easy task for an enemy with only modest technological sophistication. Accordingly, helicopter survival in a moderate threat environment is intimately dependent upon operating at low flight levels, commonly referred to as nap of the earth (NOE). Maximum survival and mission requirements for a helicopter dictate that NOE operation be carried on at night, preferably in the absence of moonlight, and under weather conditions far from ideal.

The NOE mode of operation, however, introduces flight hazards such as trees, buildings, poles, wires and even local variations of terrain. The problems are further compounded by secondary sensor effects which could be compensated when the operational environment is more nearly "normal". For example, with conventional radar, side lobe and multipath effects are compensated by time and/or amplitude discrimination. However in an NOE operation, the secondary effects become equal in magnitude to the signal sought and the system accordingly fails in its intended task.

The single most irksome impediment for NOE operations day or night, however, is the detection of wires and/or wire-like objects. This detection and recognition must occur at a range sufficiently great to permit the pilot to accomplish an evasive maneuver, while at the same time providing as little distraction as possible, taking into account the aircraft flight parameters and pilot reaction time. The uniqueness of a wire as distinguished from other categories of obstacles or radar targets has resulted in a solution as provided by the subject invention which utilizes charge coupled device (CCD) technology such as disclosed in a publication entitled, "Low Light Level Performance of CCD Image Sensors", by David D. Wen, which appeared in the proceedings of the 1975 International Conference on CCD Applications, San Diego, California, October, 1975, at pages 109–119, inclusive and U.S. Pat. Nos. 3,806,772 and 3,999,082 issued to J. Early. Additionally, infra-red (IR) detector arrays using charge coupled devices are disclosed for example in U.S. Pat. Nos. 3,902,066, Roosild, et al., 3,883,437, Nummedal, et al., and 3,808,435, Bate, et al.

SUMMARY

Briefly, the subject invention is comprised of a pulsed optical (IR) illumination source which projects short bursts of optical infra-red energy in a fan shaped beam to the target via an optical scanner and optics. The reflected radiation received from the target is optically enhanced by an image intensifier device whose output image is periodically scanned by means of an image scanner to feed the image in sequential linear segments in synchronism with the IR illuminator to a linear CCD sensor. Subsequent to this, the linear CCD sensor sequentially couples the charge signal present at each of its multiple photosites to a target site identification logic processing circuit and a memory whose contents is periodically outputted to a display device and/or alarm circuit, the display device providing a series of in-line dots or the like indicative of a wire or wire type target.

DESCRIPTION OF THE PREFERRED EMBODIMENT

Figure 1:
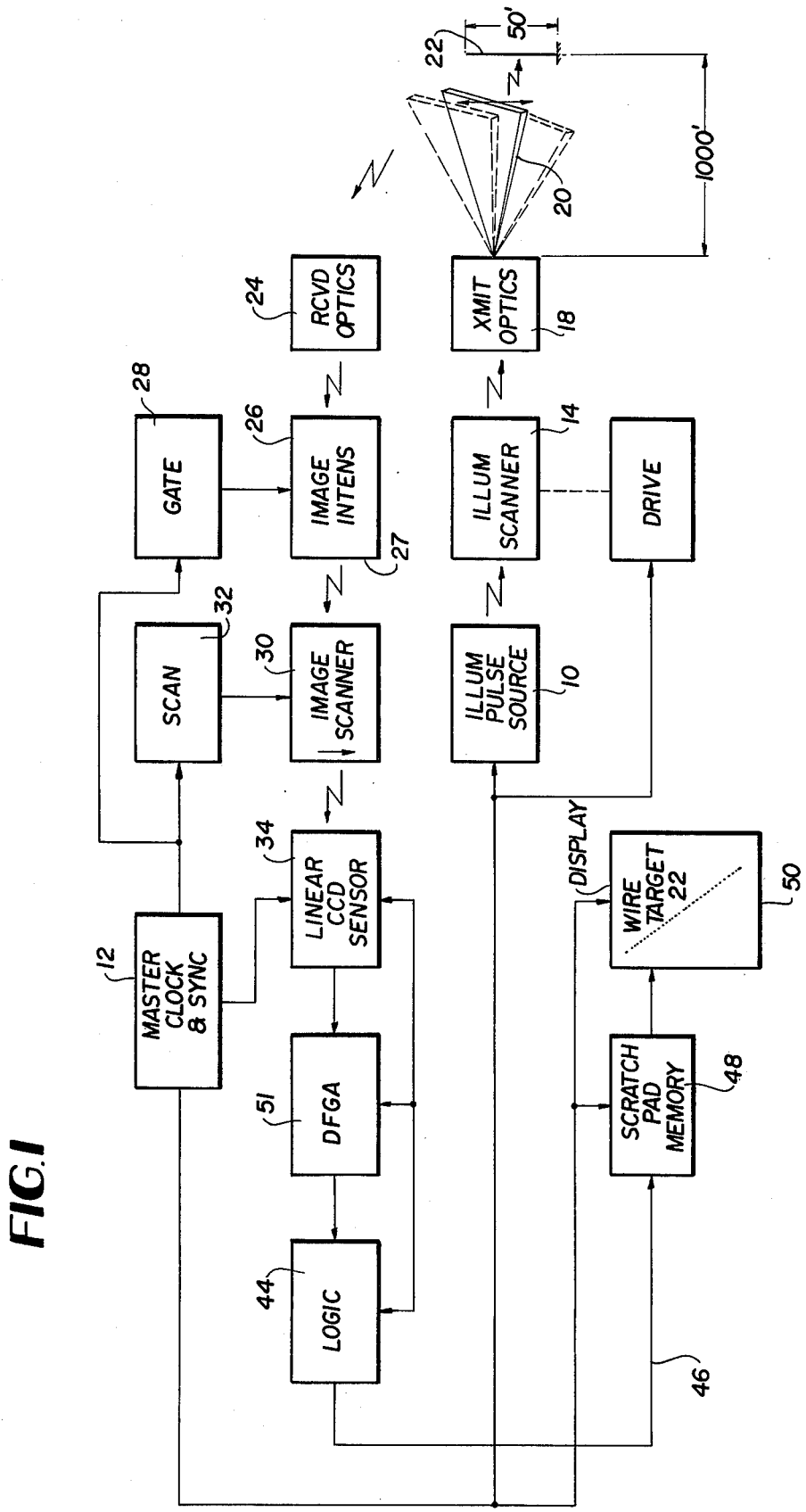
FIG. 1 is an electrical block diagram illustrative of the preferred embodiment of the subject invention.

Referring now to the drawings, and more particularly to FIG. 1, there is disclosed in block diagram form the preferred embodiment of the subject invention which consists of an optical radiation and detection unit mounted on a stabilized platform on an aircraft, such as a helicopter, with the platform being slaved to the aircraft flight vector. More specifically, the invention includes, inter alia, an illuminator 10, which for example is comprised of a gallium arsenide laser diode array under the control of a master clock and synchronizer unit 12, is periodically pulsed whereupon short bursts of infra-red (IR) energy are directed to an illuminator scanner assembly 14 which is mechanically linked to a drive unit 16 synchronized by the means 12. The scanner 14 is boresighted and operates in combination with transmitter optics 18, to produce a vertically scanned fan shaped optical beam as shown in FIG. 1 which is wide in one (horizontal) dimension, typically 30° and very narrow typically ¼° in the other (vertical) dimension. The fan shaped beam 20 is directed to a target 22 e.g. a generally vertically oriented wire having a unique characteristic insofar as detection is concerned in that its geometrical form is substantially in one dimension (length). It is desirable that a target of this type, for example, a length of wire as small as ⅛ inch in diameter 50 feet in height be detected at a minimum range of, for example, 1000 feet for an aircraft flying at 60 knots.

Accordingly, the system additionally includes receiver optics 24, which has an instantaneous field of view matched to the transmission optics 18 so as to be responsive to any reflected energy of the transmitted optical beam 20 from the target 22. The received energy from the target 22 is directed from the receiver optics 24 to an image intensifier device 26 such as an image intensifier tube controlled by a gating circuit 28 which receives sync signal from the master clock and sync unit 12. The output image of the image intensifier tube appearing on the face 27 is scanned by means of an image scanner device 30 controlled by a scanning unit 32 which also receives a sync signal from the master clock and sync unit 12. The image scanner 30, as an ilustrative example, includes a horizontal slit which is adapted to successively scan M horizontal lines of the image output on the face 27 of the intensifier tube 26 and thereby couple M sequential horizontally oriented image segments to a photo-detector array comprised of a horizontally oriented linear CCD sensor shown diagrammatically in FIG. 2. Both the image intensifier 26 and the CCD sensor 34 are pulsed off for a period of time corresponding to the time required for the optical energy to travel to and from the target 22. At the proper time as controlled by the master clock and sync unit 12, the image intensifier 26 and the CCD sensor 34 are pulsed on and the respective image segment for the particular scan line is transferred to the detector array 34.

Figure 3:
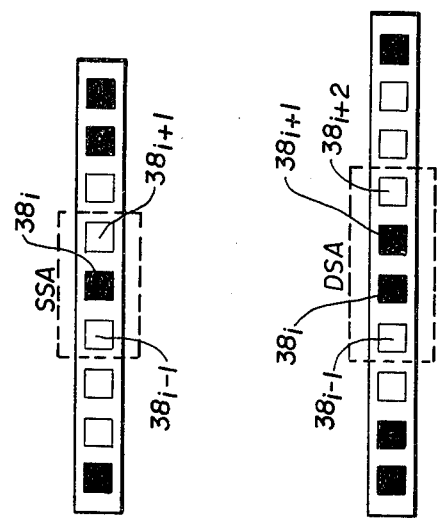
FIG. 3 is a diagram illustrative of single site activation mode of target identification.
Figure 4:
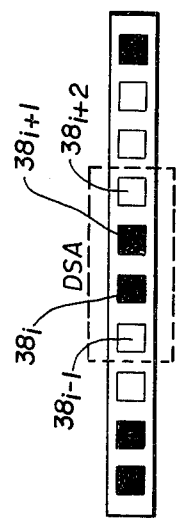
FIG. 4 is a diagram illustrative of the double site activation mode of target identification.
Figure 2:
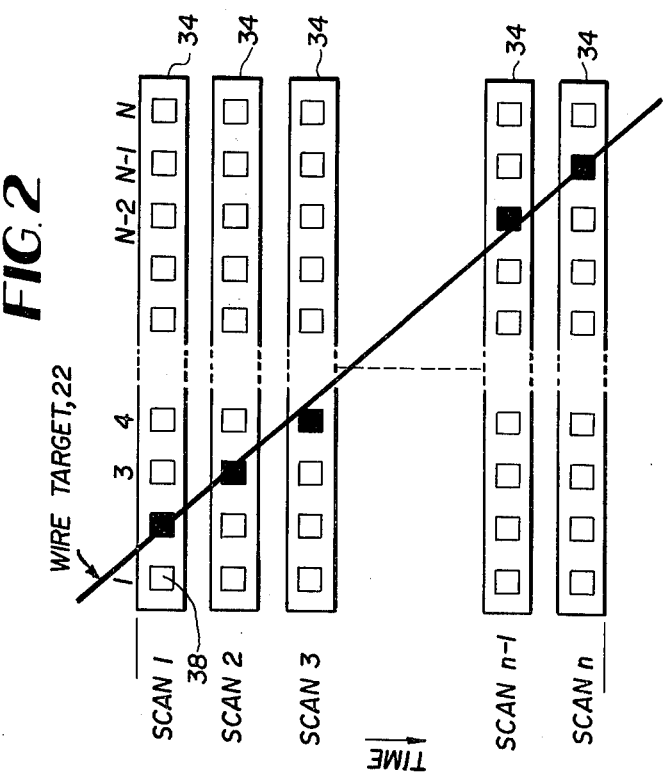
FIG. 2 is a block diagram illustrative of the target response for a linear CCD sensor for M scans of a target image.

Referring now to FIG. 2, the detector is shown comprised of a linear CCD sensor (FIG. 5) having N photoelements or photosites 38 which is mechanically scanned M times over the total field of view. M × N effective photosites are thus provided. A ⅛ or 0.125 inch diameter wire target 22 at a range of 1000 feet, for example, constitutes a $1 \times 10^{-5}$ radian target in the focal plane of each photosite. Where there are N = 1728 photosites 38 for example, the wire target 22 will occupy no more than on photosite while targets larger than a small i+ will cover more consecutive photosites. This is shown for example by the illustrative diagrams shown in FIGS. 3 and 4. By definition, FIG. 3 establishes what may be termed a "single site activation" target identification mode SSA and is defined as an energized photosite $38_i$ having an unenergized photosite $38_{i-1}$ and $38_{i+1}$ on either side of the energized photosite $38_i$ as shown. A "double site activation" target identification mode DSA can also be established when desired and becomes one wherein two consecutive photosites $38_i$ and $38_{i+1}$ are energized while having an unenergized photosite $38_{i-1}$ and $38_{i+2}$ on either side of the energized pair as shown in FIG. 4.

Figure 5:
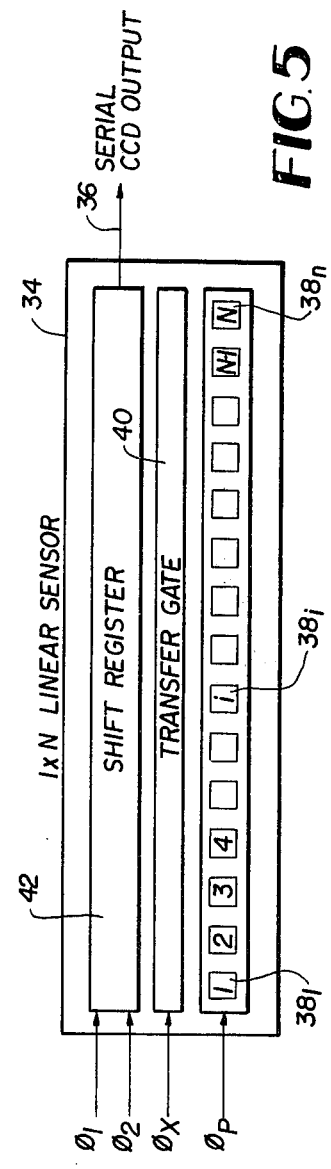
FIG. 5 is an electrical block diagram broadly illustrative of a linear CCD image sensor.

As the transmitted IR pulses are reflected from the target during a vertical scan, the N linear photosites $38_1$ ... $38_n$ sequentially receive partial target information as the image scanner 30 progresses through its M scans of the image intensifier face 27, the signal charge packets or the absence thereof at the N photosites 38 are serially clocked, i.e., transferred site by site from the linear array to SSA or DSA processor circuitry discussed below via the output line 36. To illustrate this signa transfer, a simplified block diagram of the linear sensor 34 is shown in FIG. 5. Referring to FIG. 5, each of the multiple photosites $38_1$ ... $38_n$ are enabled to be responsive to input light energy upon the application of a DC signal $\phi_p$ coupled from the master clock and sync unit 12. Adjacent each of the photosites is a transfer gate 40, which upon the application of a gate pulse signal $\phi_x$ is adapted to simultaneously couple the CCD signals from all the N photosites to an output shift register 42, which operates, for example, with a two phase clock signal $\phi_1$ and $\phi_2$ to step the charge in serial fashion to the output data line 36. Since the charge distribution of the N sites is read out serially, it is only necessary to provide a single logic circuit 44 having an output line 46 to define either SSA or DSA target segment identification. A memory 48 which may be, for example, a CCD scratch pad memory being properly addressed in response to control signals received from the master clock and sync unit 12 is adapted to store any SSA identification fed out of the logic 44 with the contents thereof being adapted to be coupled upon command to a display unit 50, having control signals fed thereto from the master clock and sync unit 12. The wire target 22 will then appear as a line of dots which would register to the eye as a wire as shown in FIG. 1. When desirable, an audible alarm device and associated apparatus, not shown, may also be included to respond to the output of the memory 48 to provide an audible indication upon the detection of a wire target.

Figure 6:
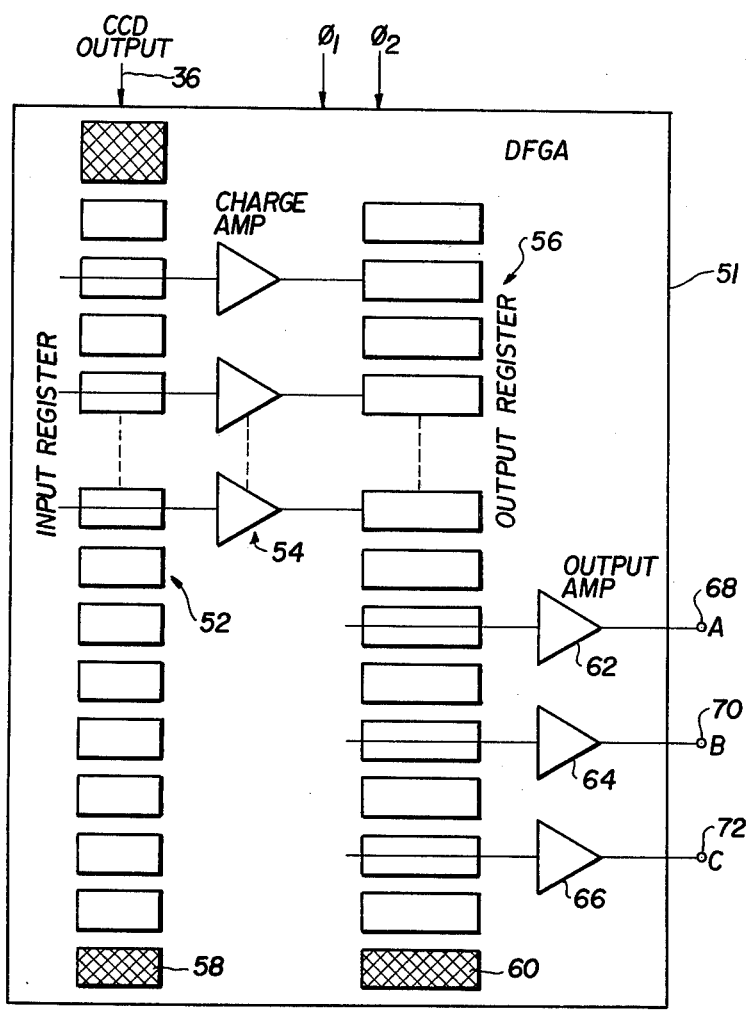
FIG. 6 is an electrical schematic diagram of a multiple output distributed floating gate amplifier (DFGA) shown in FIG. 1.

In order to logically determine the presence of an SSA state from the sequential CCD output of the linear sensor 34, a multi-stage multiple output distributed floating gate amplifier 51 is coupled between the CCD output data line 36 and the logic circuit 44. A distributed floating gate amplifier or simply DFGA employs several charge amplifiers with floating gate inputs to repeatedly sense a signal charge. Devices of this type are described not only in the Wen publication, but also in Early patents, referenced above. The DFGA 51 contemplated by the subject invention is shown in FIG. 6 and consists of a CCD input register 52 to which is coupled the CCD data line 44 from the detector array 34, shown in FIGS. 1 and 2. A plurality of charge amplifiers 54 with floating gate inputs are coupled to alternate stages of the input register 52 and couple to alternate stages of an output register 56. Both the input register 52 and the output register 56 terminate in respective sync diodes 58 and 60. As opposed to a single output DFGA, the configuration shown in FIG. 6 discloses three charge output amplifiers 62, 64 and 66 respectively coupled to terminals 68, 70 and 72 and which are thus adapted to provide amplified charge packet signals A, B, and C for three consecutive photosites, $38_{i-1}$, $38_i$ and $38_{i+1}$ which are necessary for SSA identification as illustrated in FIG. 3. Should a DSA identification be desired, it is simply necessary to include a fourth charge output amplifier, not shown, to the arrangement shown in FIG. 6 to provide another packet signal D.

Figure 7:
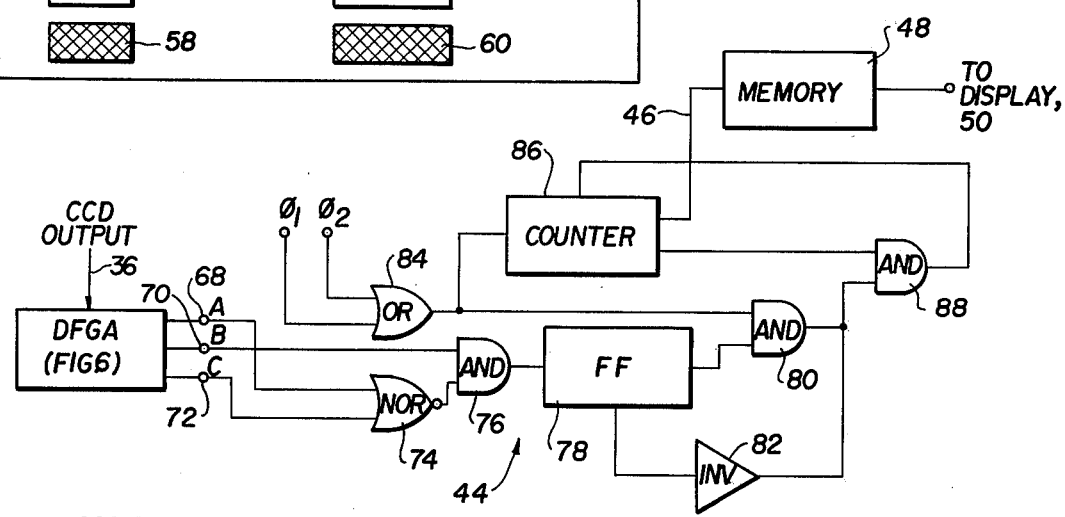
FIG. 7 is an electrical schematic block diagram illustrative of the logic circuitry utilized for the single site activation mode of the subject invention.

Referring now to FIG. 7, there is disclosed a schematic circuit diagram for the logic circuit 46 utilized for determining an SSA whereupon the outputs A, B, and C of FIG. 6 have a binary logical value of 010 respectively which is indicative of a single site activation. The absence of a charge signal provides a binary "0" value while the presence thereof provides a binary "1" value. The circuit basically includes a two input NOR logic gate 74 having its two inputs coupled to terminals 68 and 70 and a two input AND gate having one input coupled to the terminal 70 while the other input is coupled to the output of the NOR logic gate 74. The logic of a NOR gate implies that if signals A or C is high, i.e., a binary "1", the output is low, i.e. a binary "0" alternatively, if both A or C or both are low, the output will be high. Accordingly, when the signal B is high at the same time the output of the NOR circuit 74 is high, the AND gate 76 will trigger a flip-flop 78 which latches by means of a second AND gate 80, and a logic inverter 82. The two phase clock signals $\phi_1$ and $\phi_2$ disclosed with reference to the linear CCD sensors and DFGA are ORed by means of an OR gate 84 to get a high output for each clock pulse which is fed to the other input of a third AND circuit 88 together with the output of the flip-flop 78. The clock pulses from the OR circuit 84 are additionally fed to a counter circuit 86 whose output is ANDed with the high output of the second AND gate 80 by means of a third AND gate 88, the output of which is fed back to the counter 86, which then sends a second output to the memory 46 via the data line.

Thus the status of the counter 86 is outputted to the memory 48 whenever a 010 appears at the A, B and C outputs of the DFGA. The memory 48 in turn stores this value in an appropriate address location which becomes a subsequent input to the display device 48 which may be, for example, a cathode ray tube or the like to provide an output in the form of a line of data.

Figure 8:
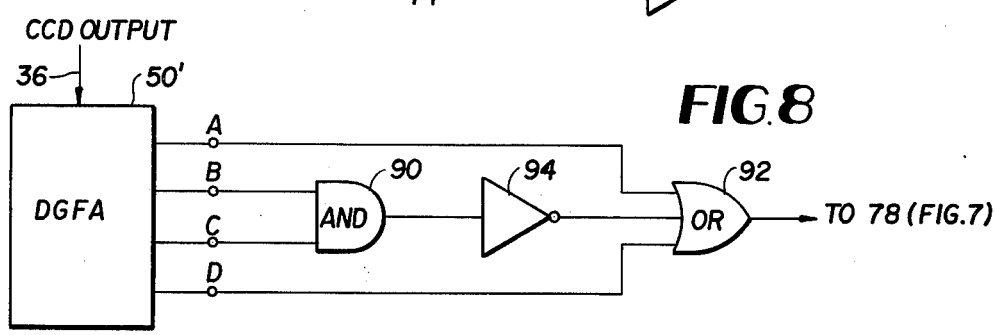
FIG. 8 is an electrical block diagram illustrative of logic circuitry for implementing the double site activation mode of operation.

In the event that the double site activation operational mode is desired, it was noted above that four consecutive photosites would be required together with a fourth output from the DFGA 51 to provide an output D. This is shown in FIG. 8. As to the logic circuitry required, an AND gate 90 coupled to signals B and C together with a three input OR gate 92 having two of its inputs connected to signals A and D while the third input is connected to the output of the AND gate 90 through a logic inverter circuit 94. This would provide a high output of the NOR gate for a combination of a binary 0110 for the signals A, B, C, and D which could then be fed to the flip-flop 78 shown in FIG. 7 together with the other circuitry associated therewith, to load the memory 46 and periodically feed its contents to the display device 48 to provide a display of a wire type target.

Thus over M scans a vertically inclined wire target will provide SSA or DSA responses consecutively. These consecutive SSAs or DSAs will bear a close geometric relationship which when the M scan results are simultaneously displayed will present a clear indication of a wire; however, random SSA or DSA indications will give a speckled pattern in the display and thus constitutes noise. Only a wire or a wire-like object will yield an orderly arrangement of such sites. In this manner, a pulsed illuminator and synchronized scanning of the return radiation via a CCD detection array comprised of a plurality of linear sensors each having a plurality of discrete photosites can be logically interpreted to provide both X and Y position and range data to locate wire obstacles for an aircraft traveling relatively close to the ground.

Having thus described what is at present considered to be the preferred embodiment of the subject invention.

I claim:

1. A detection, location and recognition system for wire type obstacles, comprising in combination:
    a pulsed source of electromagnetic energy of a frequency/wavelength capable of being transmitted to and reflected from a wire type obstacle;
    means coupled to said pulsed source and providing a scanned beam of pulsed electromagnetic energy from said source to said obstacle and receiving reflected energy therefrom;
    image forming means including output means coupled to said reflected energy for generating an image of the returned energy of each beam of pulse energy on said photo output means;
    a detector comprised of a linear charge coupled device (CCD) image sensor having N photosites which are adapted to be responsive to photo energy and being adapted to be serially read out to logic signal processor means;
    scanning means located between said image forming means and said detector and being adapted to provide M sequential scans of said image on said photo output means to couple photo energy thereat to said linear CCD image sensor;
    logic signal processor means coupled to said detector and being responsive to each sequential serial output from said linear CCD sensor to determine the presence of a charge signal at least one photosite with an absence of charge signals at photosites on either side of said at least one photosite and providing a digital output signal indicative of said charge signal;
    a digital memory coupled to and synchronously operated with said processor means and being operable to store said digital output signal and the location thereof relative to said N photosites for said linear CCD sensor; and
    means coupled to said memory for providing a composite output of said digital signals in said memory to provide an indication of a substantial linear arrangement of said digital signals to indicate the presence of a wire type object.

2. The system as defined by claim 1 wherein said pulsed source of electromagnetic energy comprises an optical energy source including an illuminator.

3. The system as defined by claim 2 wherein said means for providing a scanned beam includes optical scanner means and optics for forming a fan shaped beam of a relatively narrow width relative to its length.

4. The system as defined by claim 3 wherein said scanner means additionally includes driver means coupled thereto for effecting a predetermined scan pattern of said beam.

5. The system as defined by claim 4 wherein said image forming means comprises a gated optical image intensifier device which is gated off when said scanned beam is directed to said obstacle and is gated on thereafter for receiving reflected return energy coupled thereto, and additionally including receiver optics for coupling reflected returned energy to said image intensifier device.

6. The system as defined by claim 5 and additionally including means for synchronously operating said scanning means with the gating of said image intensifier device.

7. The system as defined by claim 4 and additionally including charge signal amplifier means coupled between said linear CCD sensor and said logic signal processor means and being operative to provide a plurality of output signals indicative of at least three consecutive photosites.

8. The system as defined by claim 7 wherein said logic signal processor means is operative to determine the presence of signal at one photosite and the absence of charge signal at the nearest photosite on either side thereof.

9. The system as defined by claim 7 wherein said signal processor means is adapted to determine the presence of signal at two immediately adjacent photosites with an absence of charge signal at the nearest photosite on either side of said two photosites.

10. The system as defined by claim 7 wherein said charge signal amplifier means comprises a distributed floating gate amplifier providing three charge output signals corresponding to three consecutive photosites of said N photosites.

11. The system as defined by claim 10 wherein said logic signal processor means includes digital logic circuit means responsive to said three charge signal output signals and being operative to provide a digital output signal of a predetermined binary value for the presence of a charge signal at one photosite with an absence of charge signal at the nearest photosites on either side.

12. The system as defined by claim 1 and additionally including an aircraft having a stabilized platform means upon which said system is mounted, and wherein said platform is slaved to the aircraft's flight vector.

13. The system as defined by claim 1 wherein said means for providing a composite output comprises a video display device.

* * * * *